United States Patent [19]

Eichler

[11] Patent Number: 4,478,260

[45] Date of Patent: Oct. 23, 1984

[54] WIRE BASKET, APPARATUS AND METHOD

[75] Inventor: Manfred Eichler, Ancaster, Canada

[73] Assignee: Braun Nursery Limited, Mount Hope, Canada

[21] Appl. No.: 515,687

[22] Filed: Jul. 21, 1983

Related U.S. Application Data

[62] Division of Ser. No. 293,607, Aug. 17, 1981, Pat. No. 4,403,447.

[51] Int. Cl.³ ............................................. B21F 3/00
[52] U.S. Cl. ................................. 140/92.1; 269/48.1; 140/112
[58] Field of Search .................... 140/92.1, 71 R, 112, 140/92.2; 269/48.1; 219/56, 58; 220/19

[56] References Cited

U.S. PATENT DOCUMENTS

| | | | |
|---|---|---|---|
| 1,013,572 | 1/1912 | Suman | 140/92.1 |
| 1,039,657 | 9/1912 | Dobkevitch | 140/92.1 |
| 1,881,659 | 10/1932 | Kellems | 140/92.1 |
| 3,437,114 | 4/1969 | Whitacre et al. | 140/71 R |
| 4,287,840 | 9/1981 | Weidner | 140/92.1 |
| 4,372,351 | 2/1983 | Myers | 140/71 R |

Primary Examiner—Lowell A. Larson
Assistant Examiner—Linda McLaughlin
Attorney, Agent, or Firm—Ridout & Maybee

[57] ABSTRACT

A wire basket for holding the root system of a plant in a ball of earth has a continuous wire strand aligned to form a tubular grid consisting of a plurality of longitudinally oriented bight strands, and a plurality of helical coils of the wire strand laid about the tubular grid, the crossing points of the bights and the coils being welded. The wire basket is made from a continuous wire strand by laying the strand in a series of back and forth bights aligned in the form of a tubular cage open at both ends, helically coiling the wire across the bights to form a continuous helical wrap, and welding the wire at the crossing points. The basket is formed on a collapsible mandrel having a central shaft, a hub member mounted on one end thereof, and a plurality of radial arms pivotally connected at one end to hub member and circumferentially spaced around the shaft, the arms being adapted to be swung toward and away from the shaft, and to be held at regulatable angles relative to the shaft. The mandrel is provided with guides for holding the wire strand while it is being wound upon the mandrel, the guides being disposed circumferentially about the shaft.

11 Claims, 6 Drawing Figures

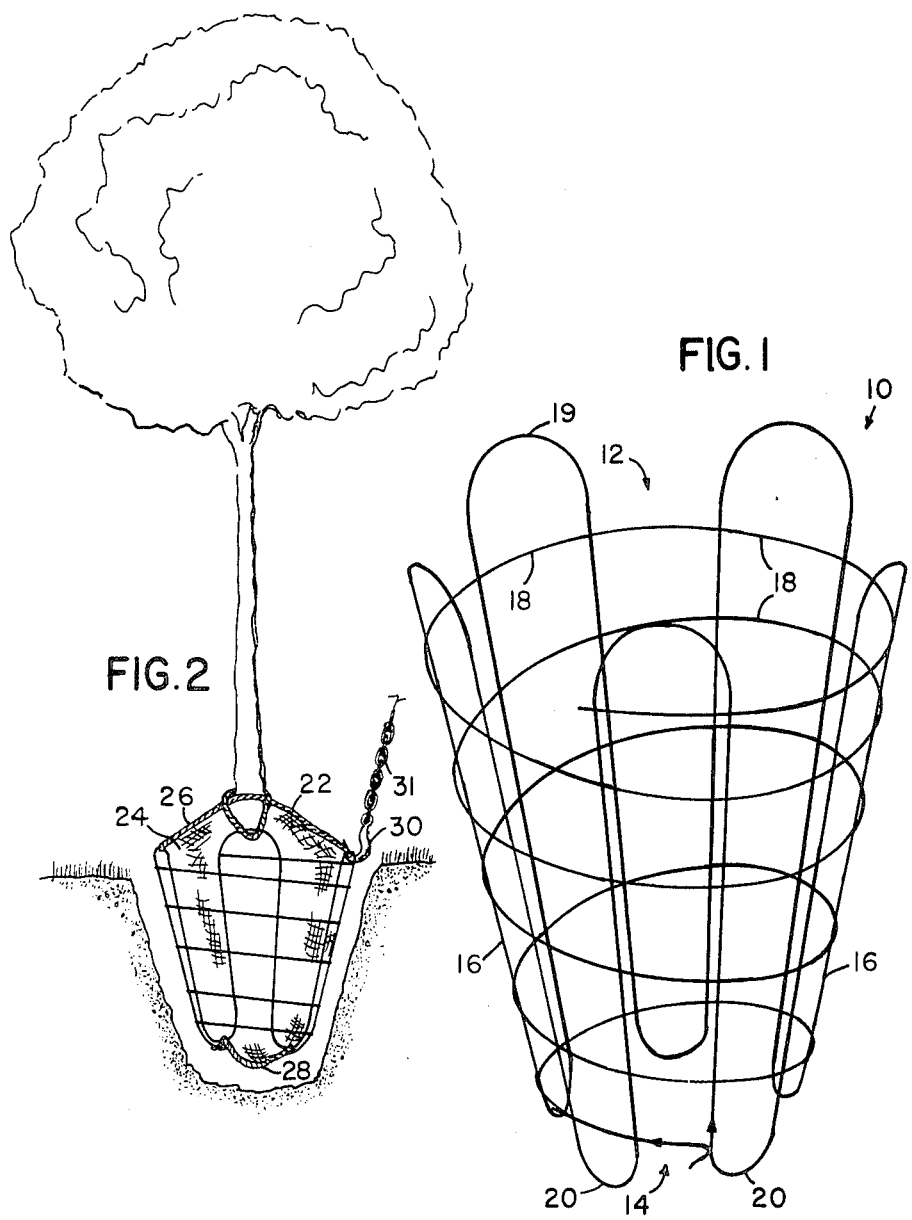

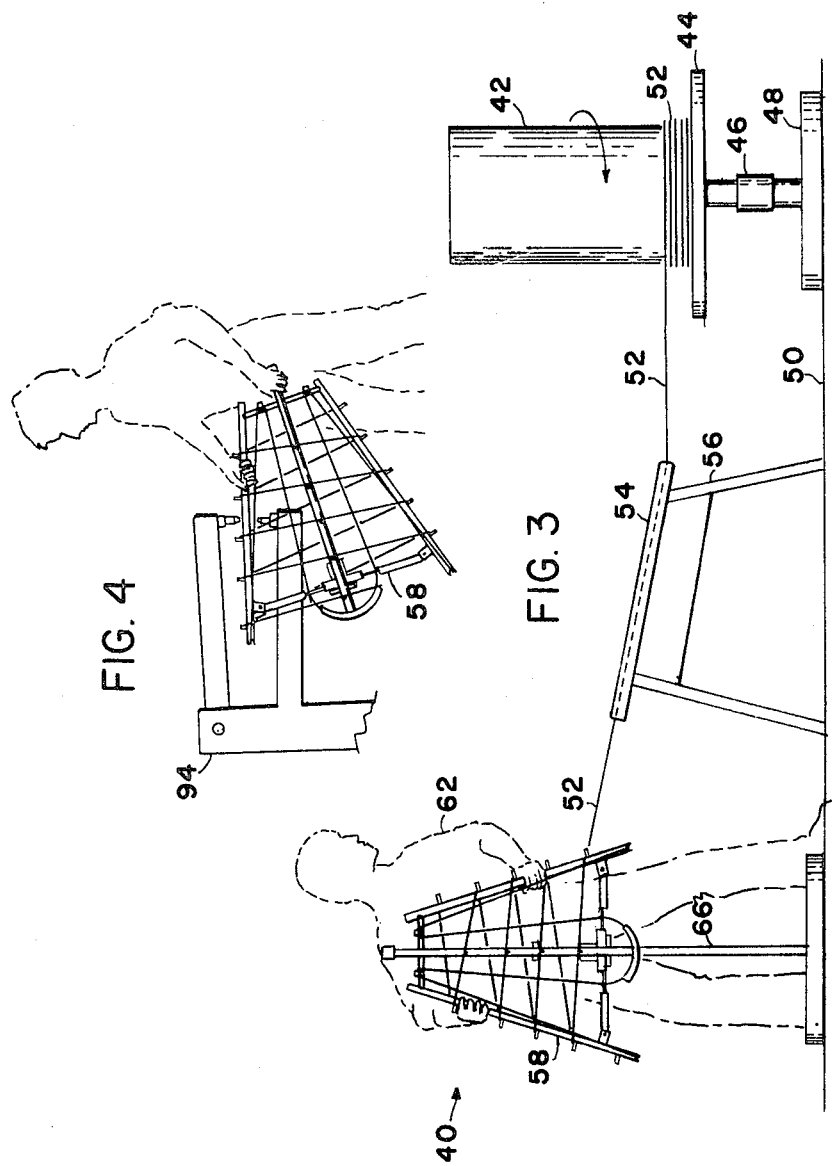

WIRE BASKET, APPARATUS AND METHOD

CROSS-REFERENCE TO RELATED APPLICATION

This application is a divisional of my copending application Ser. No. 293,607, filed Aug. 17, 1981 for "Wire Basket, Apparatus and Method" now patented, U.S. Pat. No. 4,403,447.

FIELD OF THE INVENTION

This invention relates to the manufacture of tubular wire grids or baskets, for example, such as, wire baskets used to contain the root system of a plant in a ball of earth during handling or transportation.

BACKGROUND OF THE INVENTION

Within the nursery industry, baskets of various types are used extensively in the display and transport of machine dug trees and shrubs. The baskets are intended to serve a two-fold purpose: first, to secure the root ball of the plant firmly, to prevent its deterioration during handling and transportation; and secondly, to provide a means for machine lifting and moving of the tree or shrub.

Such baskets commonly comprise an exterior framework formed of a number of lengths of wire joined together in the form of a basket-shaped grid structure, with an interior lining of a suitable material, such as burlap, or another material having a loosely woven, open mesh, so as to hold the root ball intact, while allowing moisture and nutrients to pass therethrough.

Baskets are required having various sizes and configurations, according to the variety of root systems of plants utilized by the nursery industry and according to the type of cut produced by different types of digging machines or tree spades. Such equipment generally produces a root ball cut to the shape of an inverted cone section. Accordingly, it is desirable to provide baskets which conform substantially to the shape and size of the particular root ball, in order to preserve the root system in an intact condition during handling of the plant.

The wire baskets which serve to reinforce the lining are commonly manufactured by joining together several individual strands of wire to form a grid structure having the required size and shape. Such grid structures are often subject to breaks at the junction points of the wires when subjected to the normal stresses induced during their use.

Another disadvantage inherent in the fabrication of such baskets, is that it often can be a relatively costly and complex task when it requires that many individual strands of wire be aligned together, and joined, to form the desired final shape. The degree of complexity of the task is increased in proportion to the variety of sizes and shapes required to be produced. The task of forming and joining the wire strands is often, at least in part, performed manually, it can be appreciated that such a process will require considerable skill on the part of the worker.

There is a felt need, therefore, to overcome such difficulties by providing wire baskets fabricated from continuous strands of wire, as well as methods and means for producing such baskets in a variety of shapes and sizes using relatively simple and inexpensive techniques.

SUMMARY OF THE INVENTION

According to one aspect of the invention there is provided a method of making a tubular wire grid from a continuous length of wire, comprising laying the wire continuously in back and forth bights on a mandrel, while supporting the wire at the ends of the bights, thereby forming a tubular cage consisting of a continuous warp strand, helically coiling the wire across the bights thereby forming a continuous helical wrap, joining the wire at the crossing points of the wrap and the bights, and removing the mandrel.

Alternatively, the wire may be helically coiled on the mandrel to form a tubular helical wrap, the wire being then laid continuously in back and forth bights along the tubular wrap.

According to another aspect of the invention, there is provided a wire basket made by the method of the invention.

According to yet another aspect of the invention, there is provided a collapsible mandrel for use in making a tubular wire grid by the method of the invention, comprising a central shaft defining a longitudinal axis, a hub member mounted on the shaft adjacent one end thereof, a plurality of radial arms pivotally connected at one end to the hub member for pivotal movement in radial planes toward and away from the shaft, the arms being circumferentially spaced around the shaft.

A first set of circumferentially spaced wire-receiving guide members is mounted on the hub member, a second set of circumferentially spaced wire-receiving guide members being mounted on the arms, each of the second set of guide members being mounted on a respective one of the arms at the end remote from said one end, the guide members being adapted to support a wire laid therein in back and forth bights.

A plurality of wire engaging pegs are mounted on each arm, the pegs being adapted to support a wire helically coiled about the arms. A sleeve member is slidably mounted on the shaft, and means are provided for selectively locking the sleeve member to the shaft. Linkage means are provided for interconnecting the sleeve member with the arms for expanding and collapsing the mandrel in response to sliding movement of the sleeve member on the shaft.

BRIEF DESCRIPTION OF THE DRAWINGS

FIG. 1 is a perspective view of a wire basket in accordance with the invention;

FIG. 2 is a diagrammatic sectional view showing the wire basket in use;

FIG. 3 is a side view of a collapsible mandrel in accordance with the invention, as used in the fabrication of the basket;

FIG. 4 shown an aspect of the process according to the invention, namely the welding of the crossing points of the wire grid;

DESCRIPTION OF THE PREFERRED EMBODIMENT

Figure 5:
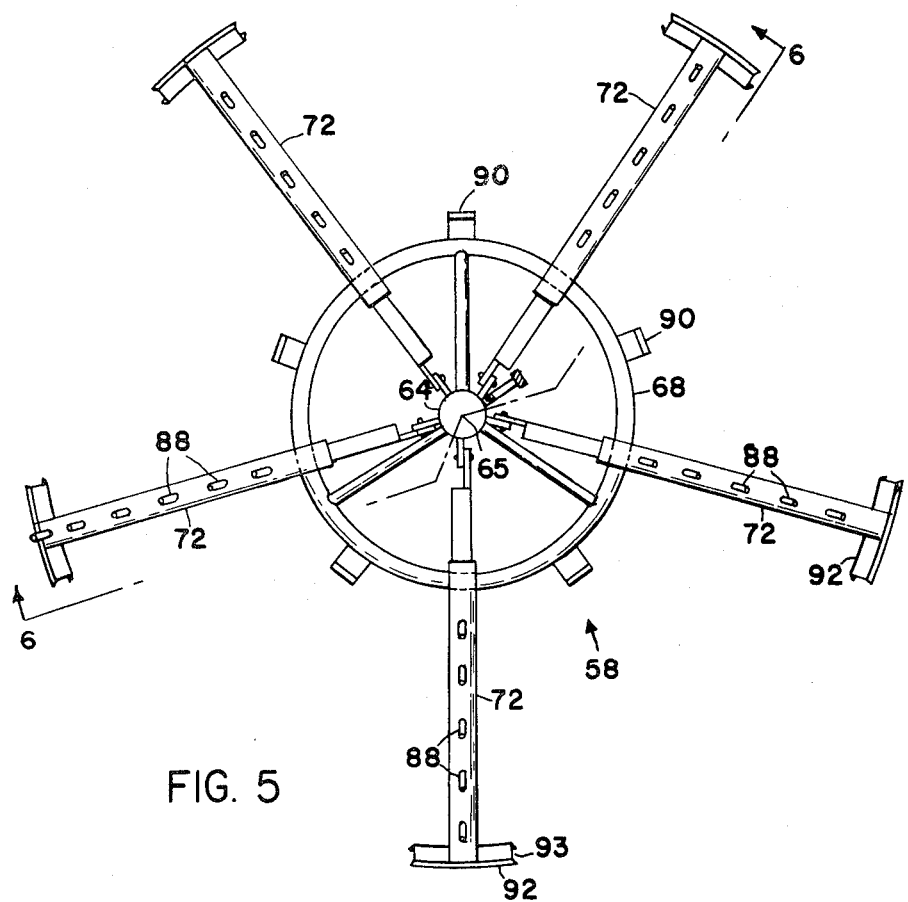
FIG. 5 is a plan view of the mandrel.

Referring to FIGS. 1 and 2, the wire basket 10, as viewed in a normal, erect position, comprises a conically shaped wire grid having an upper opening 12 into which the root ball of a plant 24 is to be inserted, and a lower opening 14, at the opposite end. The grid structure of the basket 10 consists of longitudinal grid segments 16 in the form of collateral strands of wire aligned in back and forth bights to produce a conically shaped cage. About this cage the wire is coiled helically, the turns of wire 18, being electrically welded to the grid segments 16 at the crossing points to form the completed basket. Upper and lower looped end segments (19, 20, respectively) are suitable for attaching ropes, etc. so as to permit the basket to be pulled tightly around the ball of earth, as shown in FIG. 2. FIG. 2 shows the wire basket 10 in use, preferably in combination with a suitable lining 22, of burlap or the like, which has been inserted into the wire basket prior to placing the root ball of the plant 24 thereinto. The upper and lower openings 12, 14 of the basket 10 are secured by means of ropes 26, 28 threaded through the looped end segments 19, 20, of the bights 16. In order to enable the basket holding the plant to be manipulated, a hook 30 is attached to an upper loop 19, and a chain 31 connected to the hook is secured by its opposite end to a tractor or a crane truck in order to lift the basket 10 together with the plant.

FIG. 3 illustrates the apparatus, according to the invention, designated generally by the numeral 40, including a spool 42, which is mounted on a turntable 44 for rotation about a vertical spindle 46 journalled in a base 48, the base being mounted on the floor or other surface 50. The wire 52 to be used in forming the basket is preferably a soft galvanized steel wire, the gauge of which is governed by the size of the basket and the strength required, and may vary from 0.116 to 0.162 gauge.

A length of wire 52 is wound on the spool 42, and the end of the wire 52 is threaded through a length of pipe 54 or other suitable guide mounted on a support 56 and positioned so as to direct the wire 52 at a convenient angle outwardly from the spool 42.

A collapsible mandrel 58 is positioned near the outlet of the pipe 54, so that wire threaded through the pipe can be directed toward the mandrel. The mandrel is removably mounted on a rigid support shaft 66 for rotation about a generally vertical axis, and at a suitable height in order that a worker 62, can conveniently manipulate the mandrel.

Figure 6:
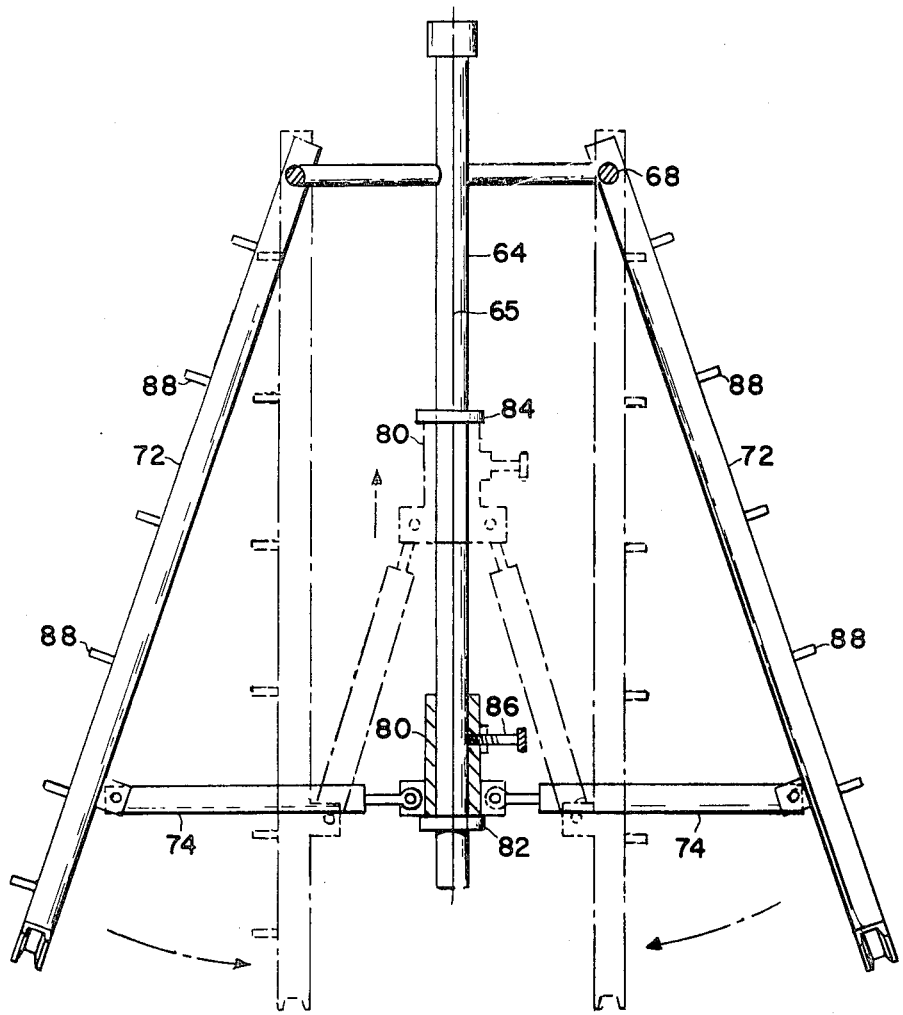
FIG. 6 is a side view of the mandrel, partly cut away through section 6—6 of FIG. 5, the arms thereof being illustrated in a fully expanded position as shown by solid lines, and in a folded position designated by broken lines.

In FIGS. 5 and 6, the mandrel 58 is shown in detail, having a central shaft 64 which defines a longitudinal axis 65, a hub member 68, rigidly mounted on the upper portion of the shaft 64, and having a diameter substantially greater than the shaft.

Five elongated arms 72 are pivotally connected at their upper ends to the hub member 68 at approximately equally spaced intervals around the shaft 64, whereby the arms can be pivotally moved in radial planes toward and away from the shaft 64, to collapse and expand the mandrel.

In order that the angular displacement of the arms 72 can be regulated uniformly, the ends of the arms remote from the hub member 68 are interconnected to the shaft by means of hinged links 74, which radiate outward from a sleeve member 80, the latter being slidably mounted on the shaft 64.

The sleeve member 80 is movable longitudinally between lower and upper limits as defined by an adjustable lower annular stop member 82 and an adjustable upper stop member 84, thereby limiting the angular displacement of the arms.

The sleeve member 80 is provided with a set screw 86 threaded therein to permit the sleeve member 80 to be tightened to the shaft 64 at any selected position within its movable range, thereby to permit the arms to be held securely at a selected position, while a wire strand is wound thereon.

While in the present embodiment the mandrel has been illustrated as having five arms hingedly attached to the hub member 68, it is of course equally possible to provide a lesser, or a greater number of arms, as may be necessary.

By moving the sleeve member 80 upward to abut against the upper stop member 84, the links 74 pull the arms inward toward the shaft 64, to collapse the mandrel into a cylindrical form wherein the arms 72 are generally parallel to the shaft 74. By moving the sleeve member downward in the direction of the lower stop 82, the arms 72 are displaced outward at angles from the collapsed positions, thereby producing a conical framework upon which a conically shaped structure can be formed. The angle of the conical section can be adjusted by positioning the sleeve member 80 at a suitable position within the limits of its travel range.

In order to permit a wire strand to be laid in back and forth bights upon the mandrel, a first set of five circumferentially spaced wire-receiving guide members 90 is mounted on the hub member, and a second set of five circumferentially spaced wire-receiving guide members 92 is mounted on the arms, remote from the first set.

The first guide members 90 are flat tabs, their ends being upturned so as to hold a wire looped over the tabs, each tab being attached to the periphery of the hub intermediate the arms.

Each of the second set of guide members 92 preferably comprises a curved rail, mounted transversely on the end of each arm 72, and defining a curved, elongated channel 93, for holding the wire looped over the rail 92, whereby a suitable spacing is provided between consecutive bight strands.

Consecutive pairs of first and second set of guide members 90, 92 are thereby adapted to support the bight strands laid back and forth lengthwise along the mandrel to form a tubular cage.

In order to permit the wire strand to be coiled helically about the mandrel, each arm is equipped with several pegs 88, mounted thereon, and preferably spaced uniformly along the length of each arm 72. The pegs are disposed to protrude outward laterally from each arm, and thereby serve as guides for the wire strand as it is coiled helically around the mandrel.

With reference to FIGS. 5 and 6, the wire basket 10 is produced by continuously feeding a strand of soft wire 52 from the spool 42, through the wire guide 54, and to the expanded mandrel 58, the latter being mounted on the support and winding the wire manually upon the mandrel.

Initially, the worker preferably ties one end of the wire at a suitable location on the mandrel and then, while rotating the mandrel, winds the wire upon it, preferably beginning with a series of back and forth longitudinal bights, collaterally with the arms 72, by looping the continuous wire strand upon consecutive first and second guides 90 and 92, respectively, thereby forming a tubular cage around the mandrel.

Upon completion of the longitudinal bights, the worker continues to rotate the mandrel, while directing the wire laterally along the pegs to form a series of helical coils 18 around the longitudinal grid. When a helical grid has been completed, the end of the wire may be cut and temporarily twisted around an adjacent grid member in order to prevent the wire from unravelling prior to joining.

While it is preferable to produce a tubular cage consisting of longitudinal bight strands prior to coiling the wire helically around the cage, it will be realized that it is equally possible to coil the wire helically about the mandrel prior to laying the longitudinal bight strands thereon.

The mandrel is then removed from the support, together with the wire structure formed thereon, and is inserted into an electrical spot welder 94, as shown in FIG. 6. The points of intersection of the helically and longitudinally oriented strands are electrically welded together, to form a permanent conically shaped basket. In order to remove the basket from the mandrel, the mandrel is simply collapsed by loosening the adjustment screw and sliding the yoke upward in the direction of the upper stop. It is apparent from FIG. 3 that when this is done, it will be possible to lift the basket from the mandrel, thereby permitting the mandrel to be returned to its original position to repeat the procedure.

I claim:

1. A method of making a tubular wire grid from a continuous length of wire, comprising:
   laying the wire continuously in back and forth bights on a mandrel, while supporting the wire at the ends of said bights, thereby forming a tubular cage consisting of a continuous wire strand,
   helically coiling the wire across said bights thereby forming a continuous helical wrap,
   joining the wire at the crossing points of the wrap and the bights, and
   removing the mandrel.

2. A method of making a tubular wire grid from a continuous strand of wire, comprising:
   helically coiling the wire on a mandrel thereby forming a tubular helical wrap,
   laying the wire continuously in back and forth bights along the tubular wrap, while supporting the wire at the ends of said bights, thereby forming a tubular cage consisting of a continuous strand,
   joining the wire at the crossing points of the wrap and the bights, and
   removing the mandrel.

3. A method as claimed in claims 1 or 2 in which the wrap and the bights are joined by electrically welding their crossing points.

4. A method of making a tubular wire grid from a continuous length of wire, comprising:
   continuously feeding the wire longitudinally to a rotary support,
   laying the wire continuously in back and forth bights on the support while supporting the wire at the end of said bights, thereby forming a tubular cage consisting of a continuous warp strand,
   orienting the support transversely to the direction of wire feed and rotating the support to coil the wire helically across said bights, thereby forming a continuous helical wrap around the cage,
   joining the wrap to the cage at the crossing points of the wire, and removing the support.

5. A method of making a tubular wire grid from a continuous length of wire, comprising:
   continuously feeding the wire longitudinally to a rotary support,
   orienting the support transversely to the direction of wire feed and rotating the support to coil the wire helically around the support, thereby forming a continuous helical wrap around the support,
   laying the wire continuously in back and forth bights on the wrap while supporting the wire at the end of said bights, thereby forming a tubular cage consisting of a continuous strand,
   joining the wrap to the cage at the crossing points of the wire, and removing the support.

6. A method as claimed in claim 4 or 5, in which the wrap and the bights are joined by electrically welding their crossing points.

7. A collapsible mandrel for use in making a tubular wire grid consisting of a continuous length of wire, comprising:
   a central shaft defining a longitudinal axis,
   a hub member mounted on said shaft adjacent one end thereof,
   a plurality of radial arms pivotally connected at one end to said hub member for pivotal movement in radial planes toward and away from said shaft, the arms being circumferentially spaced around the shaft,
   a first set of circumferentially spaced wire-receiving guide members mounted on said hub member,
   a second set of circumferentially spaced wire-receiving guide members mounted on said arms, each of said second set of guide members being mounted on a respective one of said arms at the end remote from said one end, said guide members being adapted to support a wire laid thereon in back and forth bights,
   a plurality of wire engaging pegs mounted on each arm, said pegs being adapted to support a wire helically coiled about said arms,
   a sleeve member slidably mounted on said shaft,
   means for selectively locking the sleeve member to the shaft, and
   linkage means interconnecting the sleeve member with said arms for expanding and collapsing the mandrel in response to sliding movement of the sleeve member on said shaft.

8. A mandrel as claimed in claim 7, in which said locking means is an adjustment screw threaded in the sleeve for selectively tightening the sleeve to the shaft.

9. The mandrel as claimed in claim 8, further comprising first and second longitudinally spaced annular stop members mounted on the shaft, said stop members defining a selected range of travel of the actuator.

10. A mandrel as claimed in claim 7, in which the first wire receiving guide members comprise radially extending tabs, their ends being bent so as to hold a wire strand, and in which the second wire receiving guide members are elongated rails defining curved channels adapted to hold the wire strand in loops on the ends of the arms.

11. A mandrel as claimed in claim 7, further comprising a removable support on which the shaft is journalled at one end for rotation about its axis.

* * * * *